US008339386B2

(12) United States Patent
Leon et al.

(10) Patent No.: US 8,339,386 B2
(45) Date of Patent: Dec. 25, 2012

(54) ELECTROLUMINESCENT DEVICE AGING COMPENSATION WITH REFERENCE SUBPIXELS

(75) Inventors: Felipe A. Leon, Rochester, NY (US); Christopher J. White, Avon, NY (US)

(73) Assignee: Global OLED Technology LLC, Herndon, VA (US)

( * ) Notice: Subject to any disclaimer, the term of this patent is extended or adjusted under 35 U.S.C. 154(b) by 599 days.

(21) Appl. No.: 12/568,786

(22) Filed: Sep. 29, 2009

(65) Prior Publication Data

US 2011/0074750 A1 Mar. 31, 2011

(51) Int. Cl.
*G06F 3/038* (2006.01)

(52) U.S. Cl. ............... 345/207; 345/36; 345/76; 345/77

(58) Field of Classification Search ........................ None
See application file for complete search history.

(56) References Cited

U.S. PATENT DOCUMENTS

| | | | | |
|---|---|---|---|---|
| 4,769,292 | A | 9/1988 | Tang et al. | |
| 5,061,569 | A | 10/1991 | VanSlyke et al. | |
| 6,320,325 | B1 | 11/2001 | Cok et al. | |
| 6,404,139 | B1 | 6/2002 | Sasaki et al. | |
| 7,064,733 | B2 | 6/2006 | Cok et al. | |
| 7,321,348 | B2 | 1/2008 | Cok et al. | |
| 7,850,499 | B2 * | 12/2010 | Uno et al. | 445/6 |
| 8,130,182 | B2 * | 3/2012 | Levey et al. | 345/78 |
| 2005/0280766 | A1 | 12/2005 | Johnson et al. | |
| 2006/0077136 | A1 | 4/2006 | Cok | |
| 2008/0030434 | A1 | 2/2008 | Yamazaki et al. | |
| 2008/0210847 | A1 | 9/2008 | Hente et al. | |

FOREIGN PATENT DOCUMENTS

| | | | |
|---|---|---|---|
| EP | 1 879 169 | A1 | 7/2006 |
| WO | WO 2004/097782 | | 11/2004 |
| WO | 2006/079003 | A2 | 7/2006 |

* cited by examiner

*Primary Examiner* — Muhammad N Edun
(74) *Attorney, Agent, or Firm* — Morgan, Lewis & Bockius LLP

(57) ABSTRACT

An electroluminescent (EL) device including an illumination area having one or more primary EL emitters; a reference area having a reference EL emitter; a reference driver circuit for causing the reference EL emitter to emit light while the EL device is active; a sensor for detecting light emitted by the reference EL emitter; and a measurement unit for detecting an aging-related electrical parameter of the reference EL emitter while it is emitting light. The device further includes a controller for receiving an input signal for each primary EL emitter in the illumination area, forming a corrected input signal from each input signal using the detected light and the aging-related electrical parameter, and applying the corrected input signals to the respective primary EL emitters in the illumination area.

18 Claims, 13 Drawing Sheets

ELECTROLUMINESCENT DEVICE AGING COMPENSATION WITH REFERENCE SUBPIXELS

CROSS REFERENCE TO RELATED APPLICATIONS

Reference is made to commonly-assigned, co-pending U.S. patent application Ser. No. 11/766,823, filed Jun. 22, 2007, entitled "OLED Display with Aging and Efficiency Compensations" by Levey et al (U.S. Patent Publication No. 2008/0315788), and to commonly-assigned, co-pending U.S. patent application Ser. No. 11/962,182, filed Dec. 21, 2007, entitled "Electroluminescent Display Compensated Analog Transistor Drive Signal" by Leon et al (U.S. Patent Publication No. 2009/0160740), the disclosures of which are incorporated by reference herein.

FIELD OF THE INVENTION

The present invention relates to solid-state electroluminescent (EL) devices, such as organic light-emitting diode (OLED) devices, and more particularly to such devices that compensate for aging of the electroluminescent device components.

BACKGROUND OF THE INVENTION

Electroluminescent (EL) devices have been known for some years and have been recently used in commercial display devices and lighting devices. Such devices employ both active-matrix and passive-matrix control schemes and can employ a plurality of subpixels. In an active-matrix control scheme, each subpixel contains an EL emitter and a drive transistor for driving current through the EL emitter. In some embodiments, such as displays, the subpixels are located in an illumination area of the EL device, are arranged in two-dimensional arrays with a row and a column address for each subpixel, and have respective data values associated with the subpixels. Subpixels of different colors, such as red, green, blue and white, are grouped to form pixels. In other embodiments, such as lamps, EL subpixels are located in the illumination area of the EL device and are connected in series electrically to emit light together. EL subpixels can have any size, e.g. from 0.120 $mm^2$ to 1.0 $mm^2$. EL devices can be made from various emitter technologies, including coatable-inorganic light-emitting diode, quantum-dot, and organic light-emitting diode (OLED).

EL devices pass current through thin films of organic material to generate light. The color of light emitted and the efficiency of the energy conversion from current to light are determined by the composition of the organic thin-film material. Different organic materials emit different colors of light. However, as the device is used, the organic materials in the device age and become less efficient at emitting light. This reduces the lifetime of the device. The differing organic materials can age at different rates, causing differential color aging and a device whose white point varies as the device is used. In addition, each individual pixel can age at a rate different from other pixels, resulting in device nonuniformity.

The rate at which the materials age is related to the amount of current that passes through the device and, hence, the amount of light that has been emitted from the device. Various techniques to compensate for this aging effect have been described. However, many of these techniques require circuitry in the illumination area to measure the characteristics of each EL emitter. This can reduce the aperture ratio, the ratio of EL emitter area to support circuitry area, requiring increased current density to maintain luminance, and therefore reducing lifetime. Furthermore, these techniques require time-consuming measurements of representative devices before production to determine typical aging profiles.

Hente et al, in U.S. Patent Application Publication No. 2008/0210847, describe an OLED illumination device (a solid-state light or SSL), using one or more additional EL emitter(s) located outside the illumination area to serve as a reference against which to compare measurements of each subpixel. This scheme does not use the reference area during an illumination process (when the lights are on) so that the reference is always available to represent the initial, un-aged condition of the EL device. However, this scheme requires a fixed device characteristic which must be determined at manufacturing time. Furthermore, this scheme measures voltage or capacitance, so it cannot directly sense a change in light output due to a change in EL emitter efficiency, or a change in chromaticity of the light emitted by the EL emitter.

Cok et al., in U.S. Pat. No. 7,321,348, teach an EL display with a reference pixel outside the illumination area whose voltage is measured to determine aging. In this scheme, while the EL display is active (i.e. producing light for a viewer or user, such as when a light or television is turned on), the reference pixel is driven e.g. with an estimated average of the data values. In this way the reference pixel represents the performance of the display. Compensation is then performed for the whole display based on a measured voltage of the reference pixel. However, this scheme does not compensate for nonuniformity due to differential aging of adjacent subpixels, and does not compensate for chromaticity shift.

Naugler, Jr. et al., in U.S. Patent Application Publication No. 2008/0048951, teach a scheme for compensation which also relies on determining aging curves in the lab before production begins, and storing those aging curves in memory in each product. However, since this scheme uses curves taken before manufacturing, it cannot compensate for variations in those curves between individual panels, or for long-term shifts in the average characteristics of the displays manufactured due to aging of equipment, process changes, or material changes.

Cok et al., in U.S. Pat. No. 7,064,733, teach an EL display including one or more photosensors for detecting the output of subpixels in the illumination area. However, this scheme can reduce aperture ratio and reduce lifetime as described above.

There is a continuing need, therefore, for an improved method for compensating for aging of EL emitters in an EL device that can correct for differential aging, including chromaticity shifts, and for variations within and between manufacturing lots of EL devices, without reducing aperture ratio or lifetime, and without requiring extensive measurements before production begins.

SUMMARY OF THE INVENTION

According to the present invention, there is provided an electroluminescent (EL) device, comprising:

a) an illumination area having one or more primary EL emitters;

b) a reference area having a reference EL emitter;

c) a reference driver circuit for causing the reference EL emitter to emit light while the EL device is active;

d) a sensor for detecting light emitted by the reference EL emitter;

e) a measurement unit for detecting an aging-related electrical parameter of the reference EL emitter while it is emitting light; and f) a controller for receiving an input signal for each primary EL emitter in the illumination area, forming a corrected input signal from each input signal using the detected light and the aging-related electrical parameter, and applying the corrected input signals to the respective primary EL emitters in the illumination area.

An advantage of this invention is an OLED device that accurately compensates for the aging of the organic materials in the device for each subpixel, by measuring electrical characteristics of the primary and reference EL emitters, even in the presence of manufacturing variations. By incorporating a plurality of reference EL emitters throughout the OLED device, spatial variations of the organic materials may be characterized, enabling accurate compensation throughout the OLED device. This invention can compensate for chromaticity shifts as well as for efficiency loss. It does not require pre-production measurements, and does not reduce aperture ratio or lifetime.

DETAILED DESCRIPTION OF THE INVENTION

Figure 1A:
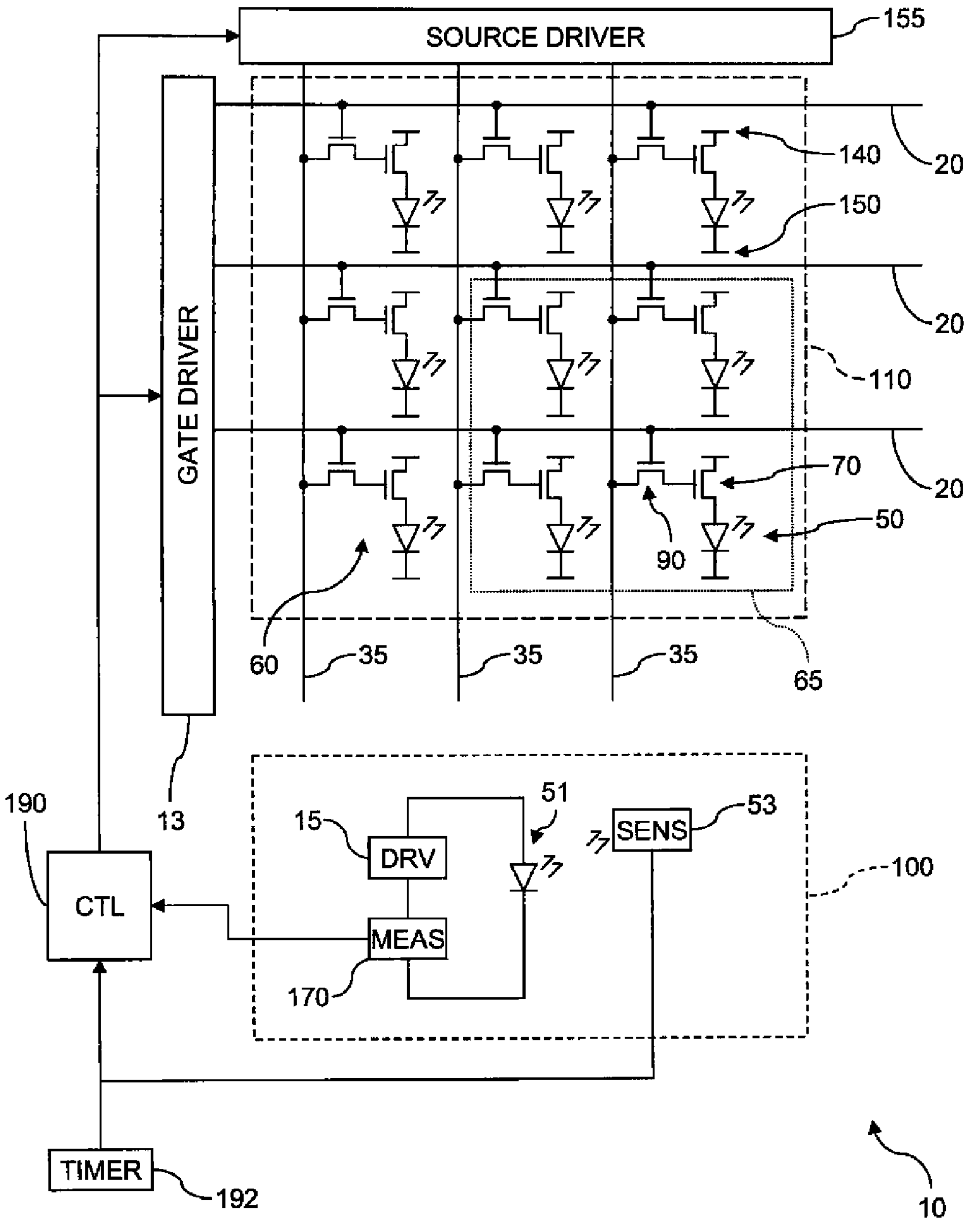
FIG. 1A is a schematic diagram of an embodiment of an electroluminescent (EL) device that can be used in the practice of the present invention.

FIG. 1A shows an electroluminescent (EL) device 10 which can be used to compensate for aging of EL emitters 50. EL device 10 can be an active-matrix EL display or programmable active-matrix EL lamp or other light source. EL device 10 includes an illumination area 110 containing a matrix of primary subpixels 60 arranged in rows and columns, each primary subpixel 60 having a primary EL emitter 50, a drive transistor 70 and a select transistor 90, and being connected to first voltage source 140 and second voltage source 150. Each row of primary subpixels 60 is connected to a select line 20, and each column of primary subpixels 60 is connected to a data line 35. The select lines are controlled by gate driver 13, and the data lines are controlled by source driver 155. Pixel 65 includes multiple EL subpixels 60, such as a red, a green, and a blue subpixel, or a red, a green, a blue, and a white subpixel. Pixel 65 can be arranged in quad, stripe, delta or other pixel patterns known in the art. Note that "row" and "column" do not imply any particular orientation of the EL device 10.

EL device 10 also includes a reference area 100 including reference EL emitter 51 that is constructed in the same way as the primary EL emitters 50. Reference EL emitter 51 is preferably identical to all primary EL emitters 50 in terms of size and composition. Reference driver circuit 15 causes reference EL emitter 51 to emit light, preferably by supplying a test current to it. Sensor 53 detects the light emitted by reference EL emitter 51, and measurement unit 170 detects an aging-related electrical parameter of reference EL emitter 51 while it is emitting light. The aging-related electrical parameter can be a current or a voltage. In this disclosure, "fade data" refers to the light detected by sensor 53 as reference EL emitter 51 ages, along with the time of operation of reference EL emitter 51 and the aging-related electrical parameter(s). Fade data is further discussed below with reference to FIGS. 2A, 7 and 8.

Reference area 100 is used to provide data on the degradation of the primary subpixels 60 in the illumination area 110. Reference EL emitter 51 is driven differently than the primary subpixels 60, and can preferably be driven at a higher current density than the highest-current-density primary subpixel 60. Data from reference EL emitter 51 does not directly correlate to the level of degradation of any primary subpixel 60. The characteristics of each primary subpixel 60 are measured and used with the data from reference EL emitter 51 to perform compensation.

EL device 10 includes controller 190, which can be implemented using a general-purpose processor or application-specific integrated circuit as known in the art. Controller 190 receives an input signal corresponding to each primary EL emitter 50 in the illumination area 110. Each input signal controls a respective emission level of the corresponding primary EL emitter. It also receives a signal corresponding to the measured light from sensor 53, and a signal corresponding to the measured aging-related electrical parameter from measurement unit 170. The controller 190 forms a corrected input signal corresponding to each input signal using the signals corresponding to the detected light and electrical parameter and applies the corrected input signals to the respective primary EL emitters in the illumination area 110 using the source driver 11 and gate driver 13 as known in the art.

The reference driver circuit 15 can cause the reference EL emitter 51 to emit light while EL device 10 is active, for example when a television employing EL device 10 is turned on by a user, or while EL device 10 is inactive, for example when the television is turned off. Measurements can be taken anytime EL device 10 is active, or when EL display 10 is inactive.

EL device 10 can also include timer 192, such as a battery-backed time-of-day clock and associated circuitry as known in the art, or a 555 or logic timer. The functions of timer 192 can also be performed by controller 190. Timer 192 runs while EL device 10 is active, and measurements of reference EL emitter 51 are taken at intervals determined by the timer. This advantageously reduces the amount of data to be collected, while maintaining high-quality compensation.

Figure 1B:
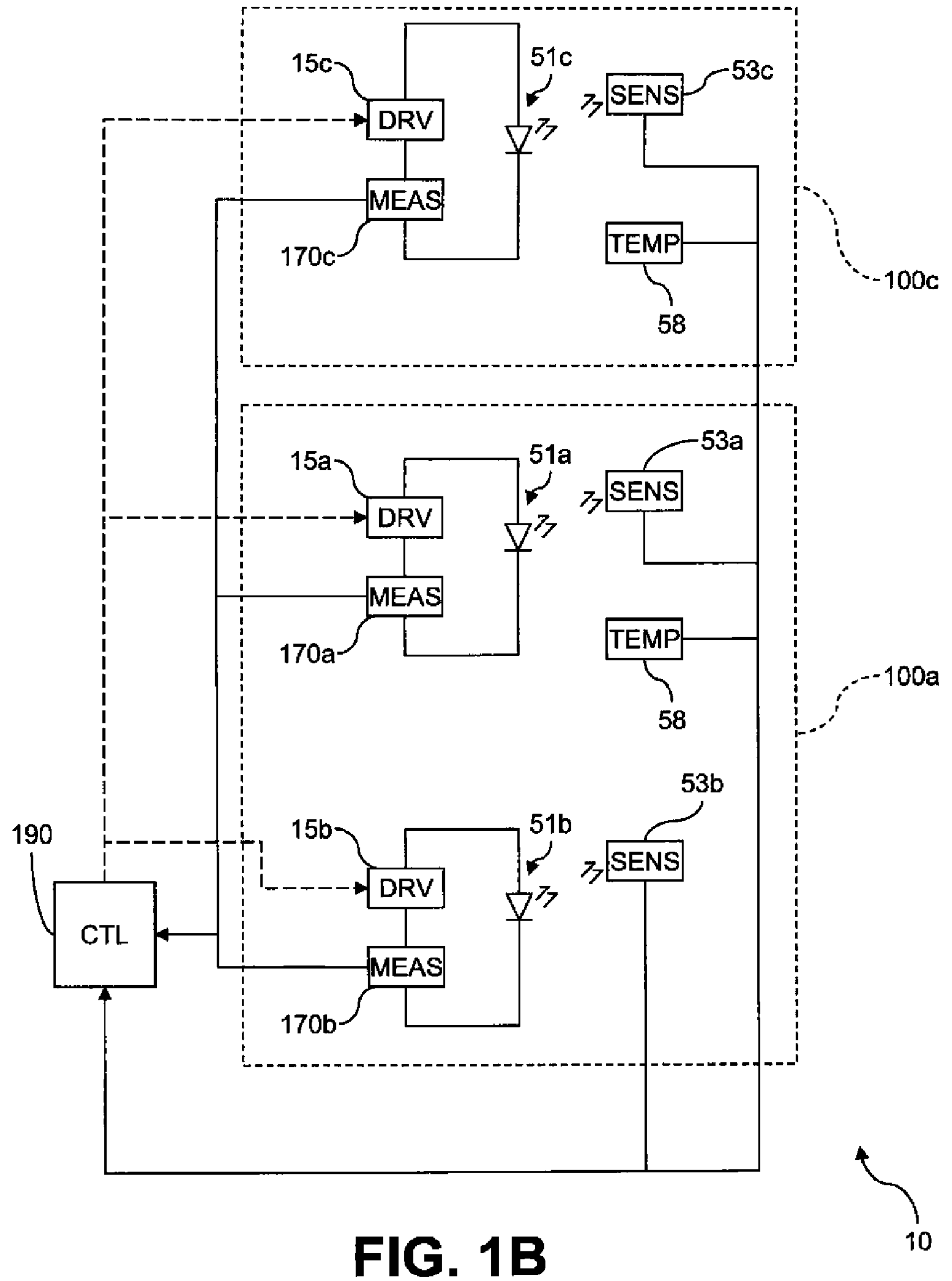
FIG. 1B is a schematic diagram of another embodiment of an EL device that can be used in the practice of the present invention.

Turning to FIG. 1B, there is shown a schematic diagram of another embodiment of an electroluminescent (EL) device that can be used in the practice of the present invention. EL device 10 includes controller 190 as described above, and a plurality of reference areas 100; 100*c*. Reference area 100*a* includes a plurality of reference EL emitters 51*a*, 51*b*; a plurality of corresponding reference driver circuits 15*a*, 15*b* for causing the respective reference EL emitters 51; 51*b* to emit light; a plurality of corresponding sensors 53; 53*b* for detecting light emitted by the respective reference EL emitters 51*a*, 51*b*; and a plurality of corresponding measurement units 170*a*, 170*b* for detecting respective aging-related electrical parameters of the respective reference EL emitters while they are emitting light. The controller uses one or more of the plurality of detected light and aging-related electrical parameters to form a corrected input signal from each input signal. As shown, the controller receives measurement information from the sensors 53*a*, 53*b* and from the measurement units 170*a*, 170*b* (solid lines).

EL device 10 also includes a second reference area 100*c* having reference EL emitter 51*c*, reference driver circuit 15*c*, sensor 53*c* and measurement unit 170*c* as described above. EL device 10 can include any number of reference areas 100; two are shown here for illustrative purposes.

A drive condition for each reference EL emitter 51 can be selected by the controller 190 or the respective reference driver circuit 15. The controller can provide control signals (dashed lines) to each reference driver circuit (e.g. 15*a*, 15*b*) to cause the reference driver circuit (15*a*, 15*b*) to drive the respective reference EL emitter (51*a*, 51*b*) in a selected condition. This is true whether there is one or more than one reference EL emitter 51. Alternatively, the reference driver circuit 15 can include a MOSFET with a fixed Vgs set by a resistive divider on the panel, so that the reference EL emitter 51 is driven at a selected current whenever power is applied to the EL device 10. This and other biasing techniques are known in the electronics art.

EL device 10 can also include a temperature measurement unit 58 for measuring a temperature parameter related to the temperature of the reference EL emitter 51*a* while the reference EL emitter 51*a* is emitting light. The controller then uses the measured temperature parameter to form the corrected input signals. The temperature measurement unit 58 can also measure the temperature of reference EL emitter 51*b*. One temperature measurement unit 58 can be provided for EL device 10, each reference area 100, or each reference EL subpixel 51.

Measurements of the reference EL emitter(s) (e.g. 51*a*, 51*b*) can advantageously be taken when EL device 10 is in thermal equilibrium. This advantageously reduces structured measurement noise due to localized heating of EL device 10. EL device 10 is likely in thermal equilibrium when activated after a period of inactivity. Controller 190 can also determine that EL device 10 is in thermal equilibrium using measurements from a plurality of temperature measurement units 58 disposed at various points around the EL device 10. If all measurements are within e.g. 5% of each other, the device is likely in thermal equilibrium. Controller 190 can also determine that EL device 10 is in thermal equilibrium by analyzing the input signals. If all input signals are within e.g. 5% of each other for a period of e.g. 1 minute, the device is likely in thermal equilibrium.

Figure 2A:
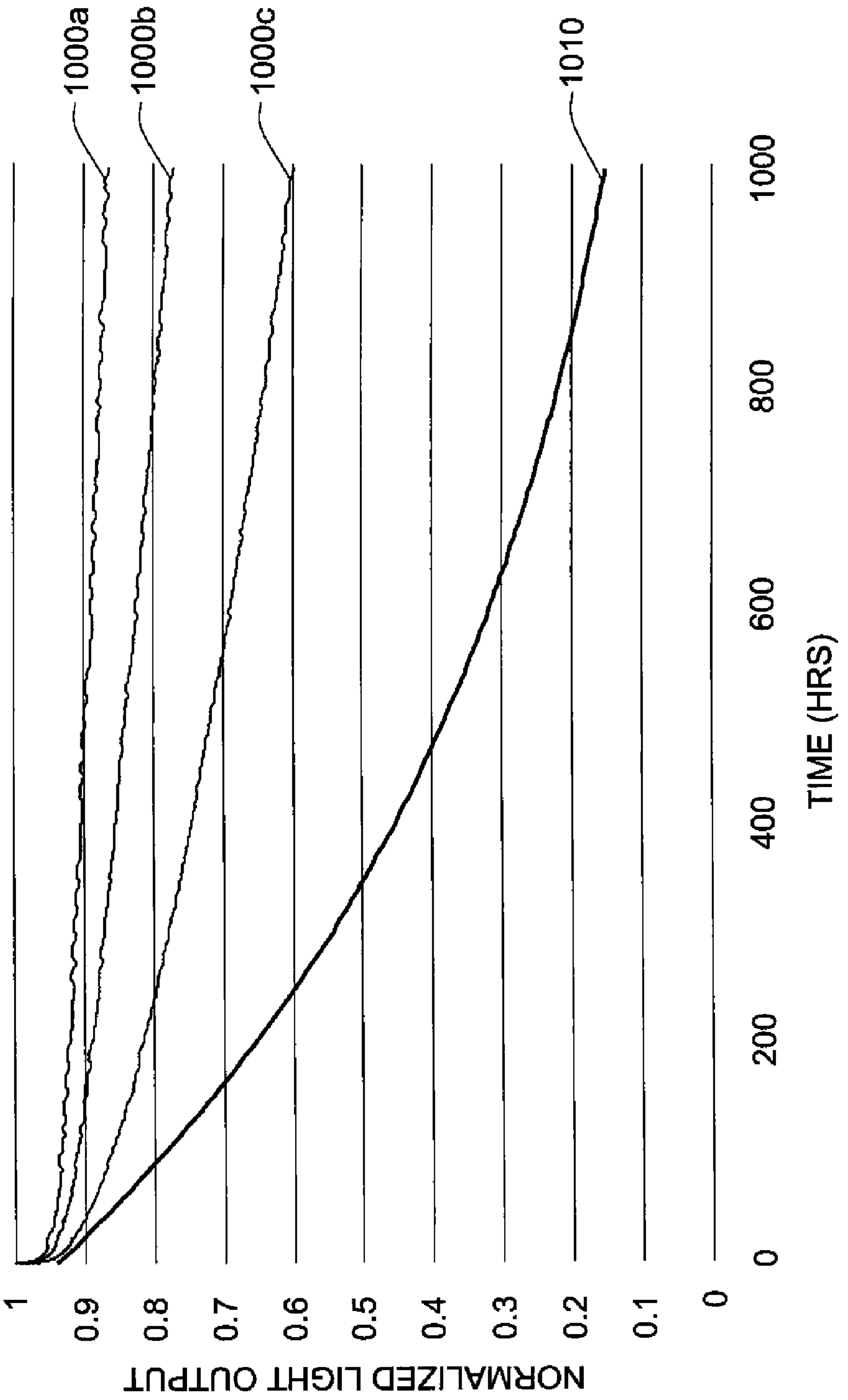
FIG. 2A is a plot of EL emitter aging showing normalized light output over time.

FIG. 2A shows fade data for a representative EL device, specifically an OLED device. The abscissa is time of operation at constant current, in hours, and the ordinate is normalized light output, 1.0 being the initial light output. Operational curves 1000*a*, 1000*b*, 1000*c* show measured data for constant current densities of 10, 20 and 40 mA/cm$^2$, respectively. These three levels are representative of the range encountered in OLED devices. As shown, the OLED outputs less light for a given current as it ages. Fade curve 1010 shows extrapolated data for a constant current density of 80 mA/cm$^2$. This current density is higher than typically encountered in OLED devices. Amer a given amount of time, the OLED has aged more (has a lower normalized light output) along fade curve 1010 than along any of the three operational curves 1000*a*, 1000*b*, 1000*c*. Therefore, the aging behavior of reference EL emitter 51 can be used as a proxy for the aging behavior of primary EL emitter 50. To provide this feature, referring back to FIG. 1A, reference driver circuit 15 causes reference EL emitter 51 to emit light at two levels, a measurement and fade level, at different times. For example, the fade level can be 80 mA/cm$^2$ and the measurement level can be 40 mA/cm$^2$. The fade level is preferably greater than the measurement level. Furthermore, the fade level is preferably greater than the maximum of the respective emission levels commanded by the input signals.

Measurements of reference EL emitter 51 are then taken while it emits light at the measurement level. This advantageously permits measurements to be taken at levels representative of those encountered by the primary EL emitters 50, reducing representation risk. It also advantageously permits rapid aging of the reference EL emitters so that aging data appropriate for use with any primary EL emitter 50 is available from a reference EL emitter 51.

In another embodiment, the reference driver circuit causes the reference EL emitter to emit light successively at a plurality of measurement levels, and respective measurements of the reference EL emitter are taken while it emits light at each measurement level. This advantageously provides data correlated with the variety of emission levels commanded by the input signals.

Figure 2B:
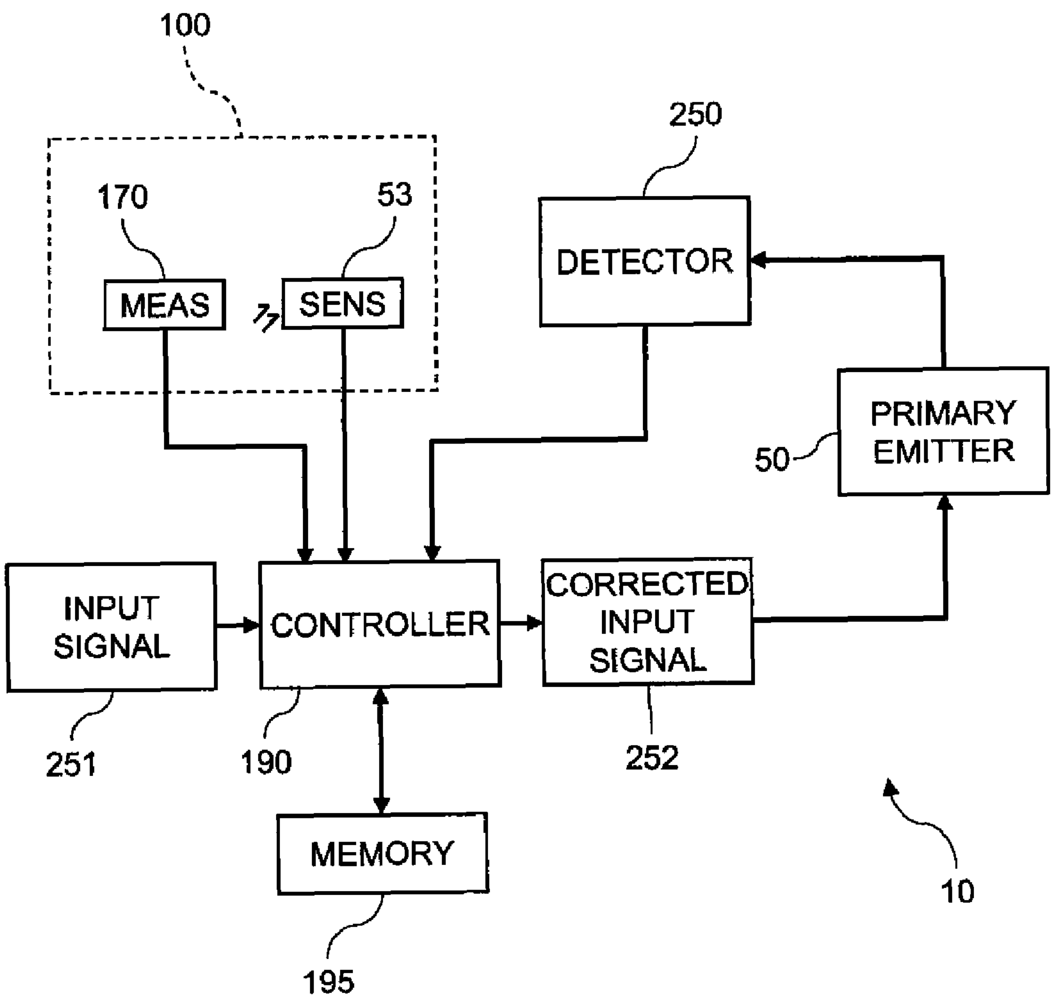
FIG. 2B is a data-flow diagram according to an embodiment of the present invention.

FIG. 2B shows a flow diagram of data through components of EL device 10 according to an embodiment of the present invention. For clarity, only one primary EL emitter is shown, but a plurality of primary EL emitters can be used. In this embodiment, the controller is adapted to form a corrected input signal 252 which compensates for loss of efficiency of the primary EL emitter 50 due to aging. Input signal 251 is provided by image-processing electronics or other structures known in the art. Controller 190 forms corrected input signal 252 from input signal 251 to compensate for aging of primary EL emitter 50. Corrected input signal 252 is supplied to primary EL emitter 50 in EL subpixel 60 (FIG. 1A) to cause primary EL emitter 50 to emit light corresponding to the corrected input signal 252. EL device 10 can also include memory 195 for storing detected light measurements and corresponding aging-related electrical parameter measurements, and the controller can use the values stored in the memory to form the corrected input signals. Memory 195 can be non-volatile storage such as Flash or EEPROM, or volatile storage such as SRAM.

Each input signal 251, and each respective corrected input signal 252, corresponds to a single EL subpixel 60 and its primary EL emitter 50. Controller 190 produces each corrected input signal 252 using the aging-related electrical parameter of reference EL emitter 51 (FIG. 1A) detected by measurement unit 170 in reference area 100. It uses the light from reference EL emitter 51 detected by sensor 53. These two values are used when computing corrected input signals for multiple EL subpixels 60. The controller also uses, for each primary EL emitter 50, a respective measurement of an aging-related electrical parameter from that primary EL emitter 50, measured by detector 250, described below. That is, fade data from one reference EL emitter 51 is used in compensating for aging of multiple primary EL emitters 50. This advantageously reduces complexity and storage requirements of EL device 10 and takes advantage of underlying similarities in the physical properties of all primary EL emitters 50 on EL device 10.

By using fade data measured in the reference area and aging-related electrical parameter measurements from each primary EL emitter 50 to form corrected input signal 252 for each primary EL emitter 50, corrected input signal 252 is adapted to compensate for the loss of efficiency, i.e. the reduction in light output for a given current, of each primary EL emitter 50 due to aging. Corrected input signals 252 correspond to higher currents through primary EL emitter 50 than input signals 251. The more a primary EL emitter 50 ages, and the lower its efficiency becomes, the higher the ratio will be of the current corresponding to corrected input signal 252 to the current corresponding to input signal 251.

As known in the art, the input signals 251 can be provided by a timing controller (not shown). The input signals 251 and the corrected input signals 252 can be digital or analog, and can be linear or nonlinear with respect to commanded luminance of primary EL emitter 50. If analog, they can be a voltage, a current, or a pulse-width modulated waveform. If digital, they can be e.g. 8-bit code values, 10-bit linear intensities, or pulse trains with varying duty cycles.

Figure 3:
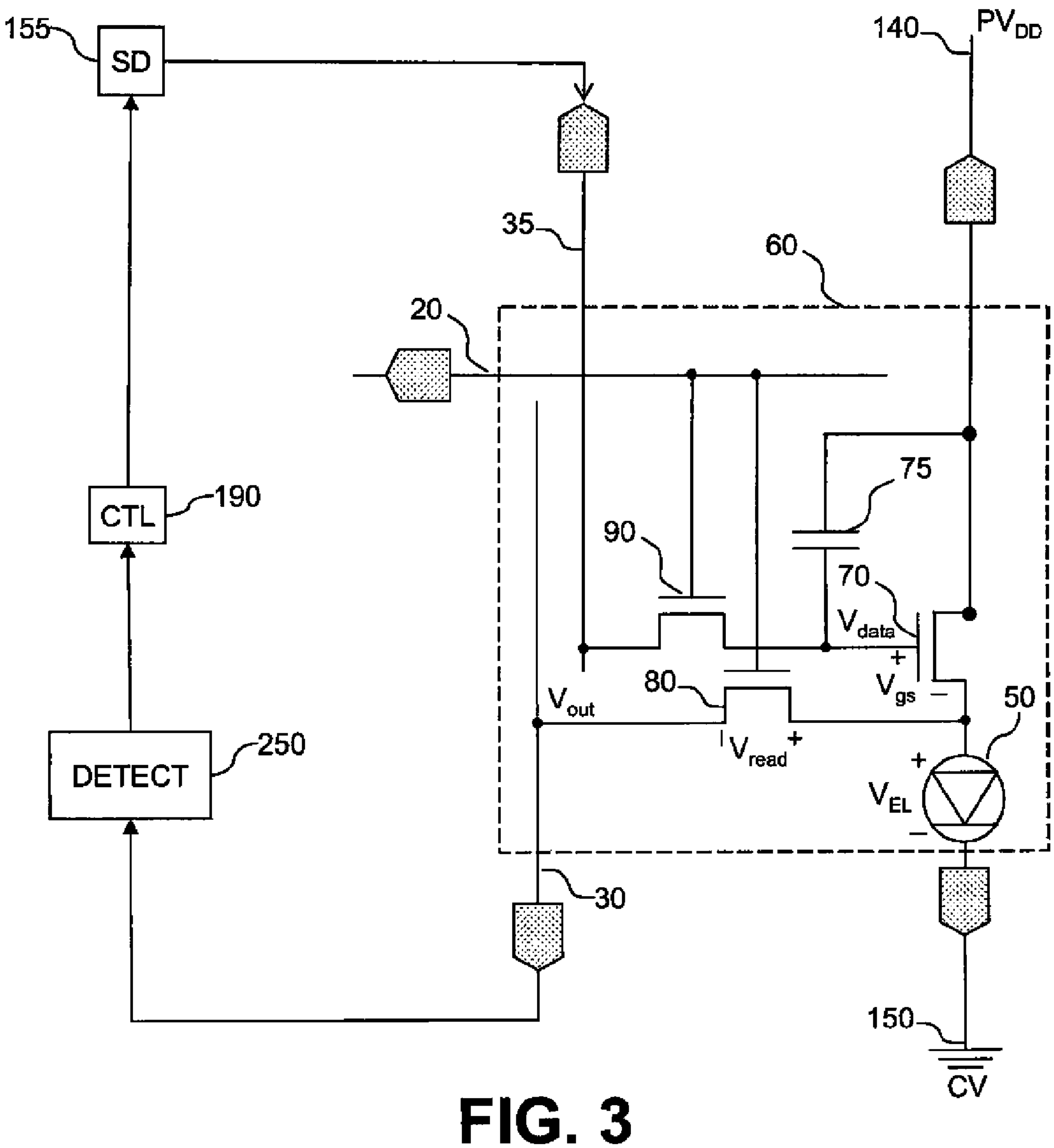
FIG. 3 is a schematic diagram of an embodiment of an EL subpixel in the illumination area and its associated circuitry that can be used in the practice of the present invention.
Figure 4:
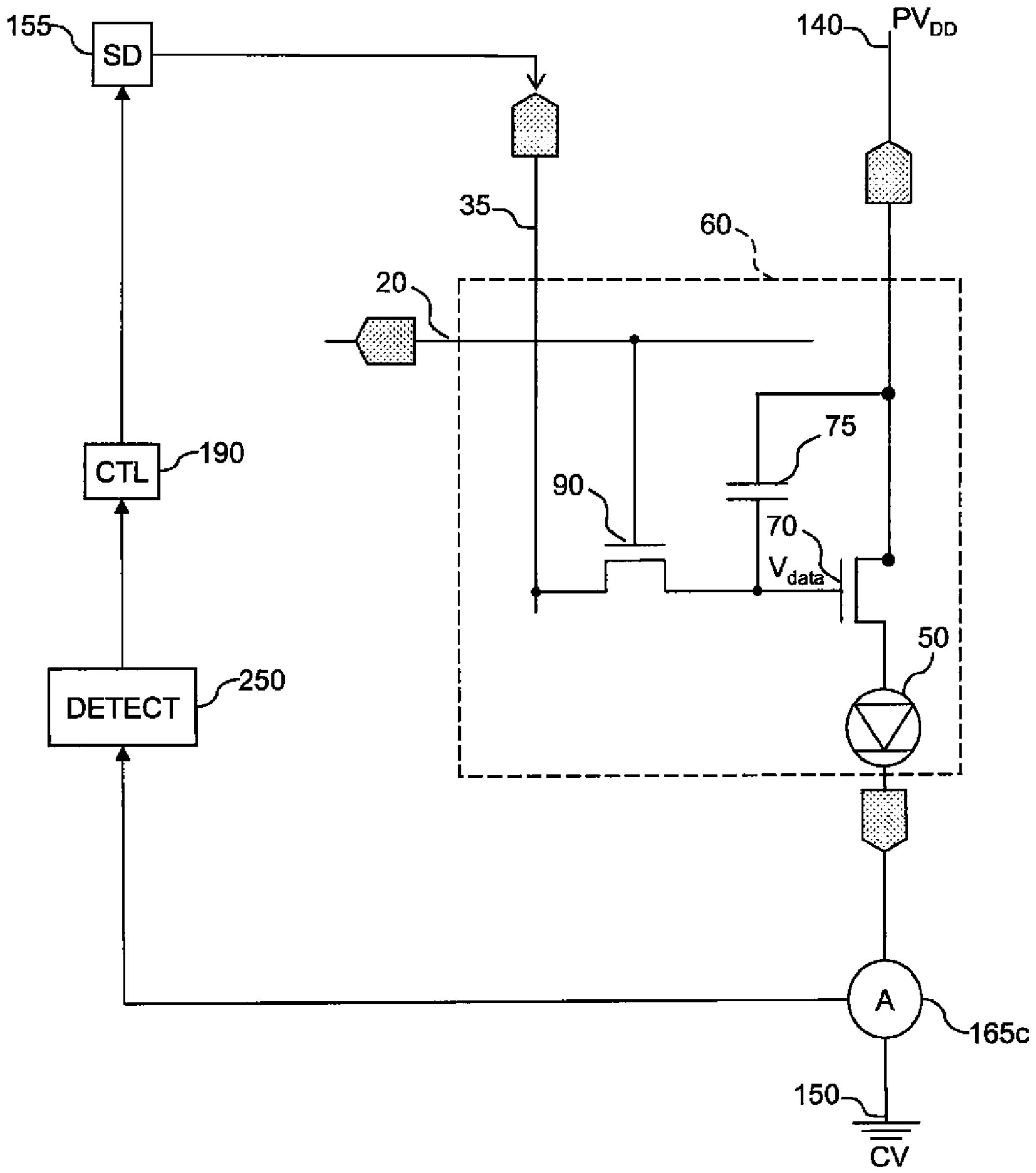
FIG. 4 is a schematic diagram of another embodiment of an EL subpixel in the illumination area and its associated circuitry that can be used in the practice of the present invention.

Two embodiments of EL subpixels 60 in the illumination area 110 (FIG. 1A) and corresponding detectors 250 according to various embodiments of the present invention are shown in FIGS. 3 and 4.

FIG. 3 shows a schematic diagram of one embodiment of an EL subpixel 60 and associated circuitry that can be used in the practice of the present invention. EL subpixel 60 includes primary EL emitter 50, drive transistor 70, capacitor 75, readout transistor 80, and select transistor 90. Each of the transistors has a first electrode, a second electrode, and a gate electrode. A first voltage source 140 is connected to the first electrode of drive transistor 70. By connected, it is meant that the elements are directly connected or connected via another component, e.g. a switch, a diode, another transistor, etc. The second electrode of drive transistor 70 is connected to a first electrode of EL emitter 50, and a second voltage source 150 is connected to a second electrode of EL emitter 50. Select transistor 90 connects data line 35 to the gate electrode of drive transistor 70 to selectively provide data from data line 35 to drive transistor 70 as well-known in the art. Row select line 20 is connected to the gate electrode of select transistor 90 and readout transistor 80.

The first electrode of readout transistor 80 is connected to the second electrode of drive transistor 70 and also to the first electrode of EL emitter 50. Readout line 30 is connected to the second electrode of readout transistor 80. Readout line 30 provides a readout voltage to detector 250, which measures the readout voltage to provide a status signal representative of characteristics of EL subpixel 60. Detector 250 can include an analog-to-digital converter.

Data from detector 250 is provided to controller 190 as described above. Controller 190 provides corrected input signal 252 (FIG. 2B) to source driver 155, which in turn supplies corresponding data to EL subpixel 60. Thus, controller 190 can provide compensated data while EL device 10 is active. Controller 190 can also provide predetermined data values to data line 35 during the measurement of EL subpixel 60.

The readout voltage measured by detector 250 can be equal to the voltage on the second electrode of readout transistor 80, or can be a function of that voltage. For example, the readout voltage measurement can be the voltage on the second electrode of readout transistor 80, minus the drain-source voltage of readout transistor 80. The digital data can be used as a status signal, or the status signal can be computed by controller 190 as will be described below. The status signal represents the characteristics of the drive transistor and EL emitter in the EL subpixel 60.

Source driver 155 can comprise a digital-to-analog converter or programmable voltage source, a programmable current source, or a pulse-width modulated voltage ("digital drive") or current driver, or another type of source driver known in the art.

FIG. 4 shows a schematic diagram of another embodiment of an EL subpixel and associated circuitry that can be used in the practice of the present invention. EL subpixel 60 includes primary EL emitter 50, drive transistor 70, capacitor 75 and select transistor 90, all of which are as described above. This embodiment does not include a readout transistor. First voltage source 140, second voltage source 150, data line 35, and row select line 20 are as described above.

Current measuring unit 165*c*, which can include a resistor and sense amplifier (not shown), Hall-effect sensor, or other current-measuring circuits known in the art, measures the current through the EL emitter 50 and provides the current measurement to detector 250, which can include an analog-to-digital converter. Data from detector 250 is provided to controller 190 as described above. Controller 190 provides corrected input signal 252 (FIG. 2B) to source driver 155, which in turn supplies corresponding data to EL subpixel 60. Thus, controller 190 can provide compensated data while EL device 10 is active. Controller 190 can also provide predetermined data values to data line 35 during the measurement of EL subpixel 60. Current measuring unit 165*c* can be located on or off EL device 10. Current can be measured for a single subpixel or any number of subpixels simultaneously.

Figure 5:
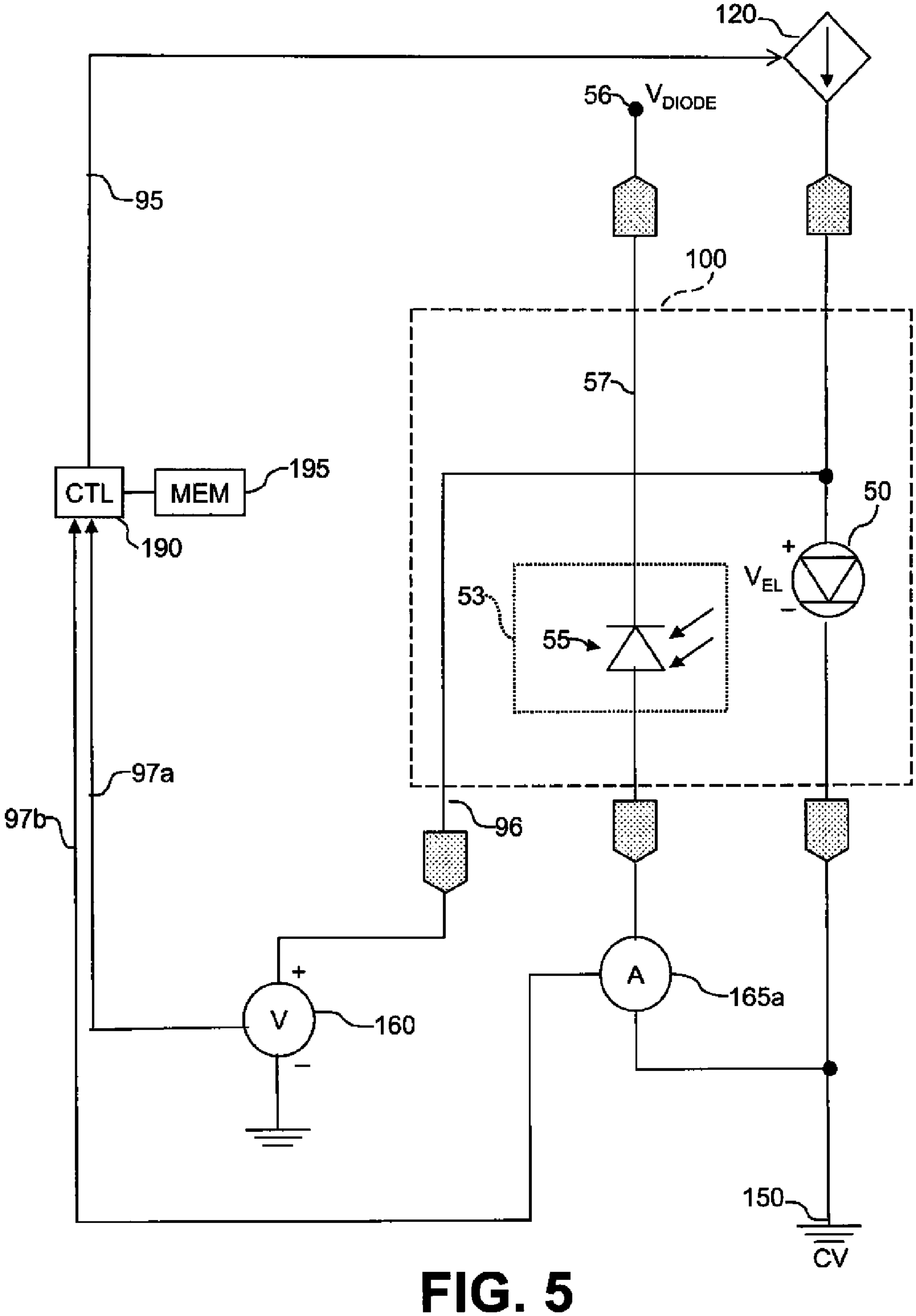
FIG. 5 is a schematic diagram of one embodiment of a reference area that can be used in the practice of the present invention.
Figure 6:
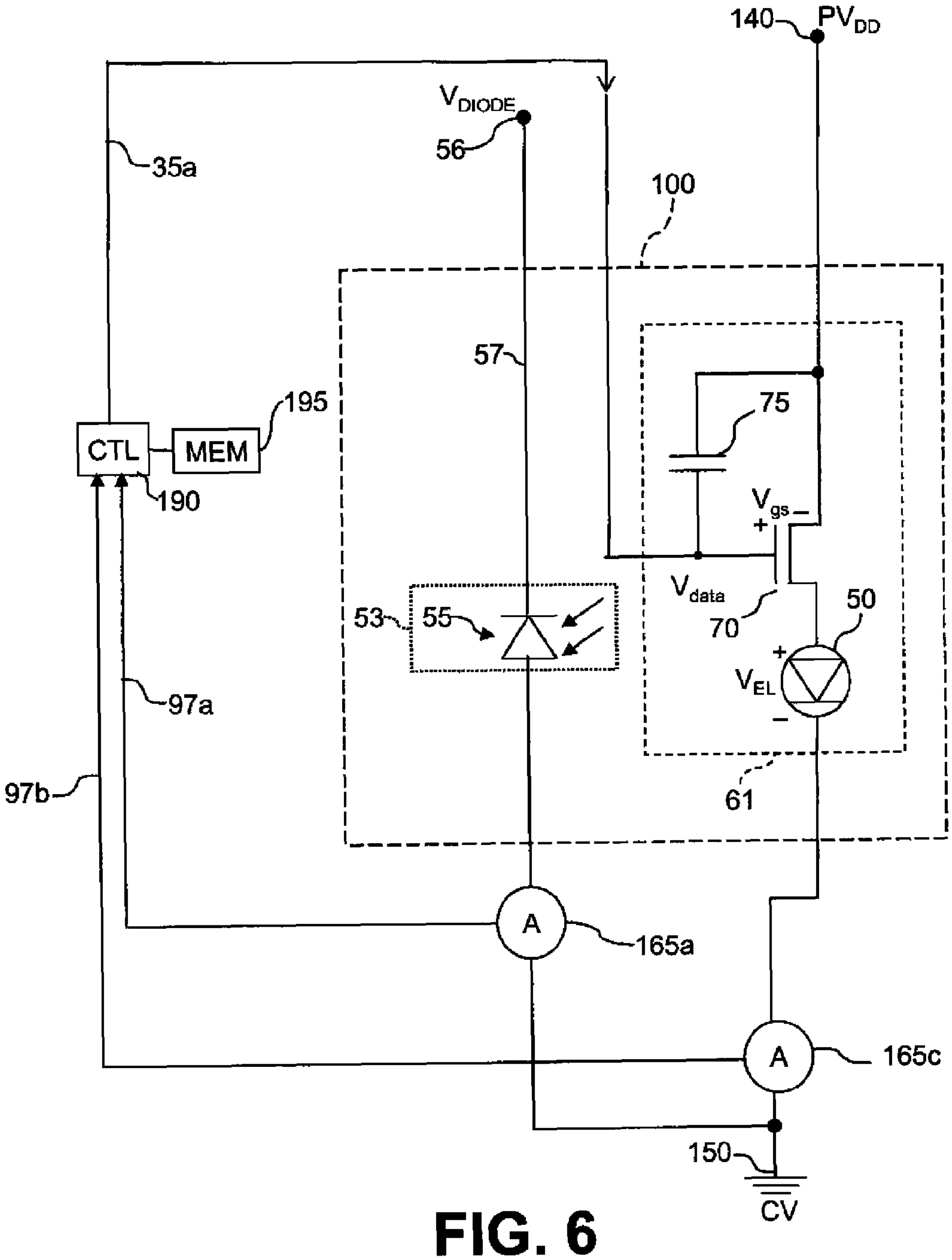
FIG. 6 is a schematic diagram of another embodiment of a reference area that can be used in the practice of the present invention.

Two embodiments of reference areas 100 according to various embodiments of the present invention are shown in FIGS. 5 and 6.

FIG. 5 shows an embodiment of circuitry in a reference area 100. Reference area 100 includes EL emitter 50 having the same EL materials used in the illumination area 110 (FIG. 1A). Controlled current source drives current through EL emitter 50. The amount of current supplied by controlled current source 120 is determined by a signal provided by a controller 190 via a control line 95. Voltage measuring unit 160 measures the voltage $V_{EL}$ across the EL emitter 50 via readout line 96, and sends the measured voltage to processing unit 190 via measurement data line 97*a*. Simultaneously with the voltage measurement, the light output of the EL emitter 50 is measured by photodiode 55 in sensor 53. Bias voltage 56 ($V_{DIODE}$) is provided to photodiode 55 via diode supply line 57. Bias voltage 56 can be provided by a conventional DAC, voltage supply, or signal driver as known in the art. The current through photodiode 55 is measured by current measuring unit 165*a*, which can include a resistor and sense amplifier (not shown), Hall-effect sensor, or other current-measuring circuits known in the art. The photodiode current can be passed to second voltage source 150 (as shown) or to another ground.

The measured current is sent to processing unit 190 via measurement data line 97*b*. Processing unit 190 stores measurements taken over time in memory 195 and tracks changes in the measurements over time. The process of driving and measuring described above may be repeated at more than one level by adjusting the controlled current source 120 to sequentially provide a plurality of levels of current and taking corresponding voltage and light-output measurements while controlled current source 120 provides each successive level of current. This permits characterization of EL emitter 50 degradation under various drive conditions. Photodiode 55 can be integrated into the device backplane electronics, in which case it is located in reference area 100, or provided of the device backplane.

Referring to FIG. 6, in another embodiment, reference area 100 includes reference subpixel 61 having drive transistor 70 and capacitor 75 as described above, and EL emitter 50 having the same EL materials used in subpixels 60 (FIG. 1A) in illumination area 110 (FIG. 1A). Reference subpixel 61 is preferably identical to subpixel 60, but is located in reference area 100 rather than illumination area 110. Reference EL subpixel 61 can be a different size or shape than EL subpixel 60. First voltage source 140 and second voltage source 150 have the same voltages in the reference area 100 as in the illumination area 110. A gate voltage is provided to the gate of the drive transistor 70 via the gate control line 35*a* to cause current to flow through EL emitter 50. The gate voltage can also be provided by a source driver 155, as shown on FIG. 4. The amount of current flowing through the reference subpixel is determined by the signal provided to the gate of the drive transistor 70, the characteristics of the drive transistor 70, power source voltages 140 and 150, and the characteristics of the EL emitter 50. The current flowing across the EL emitter 50 is measured by current measuring unit 165*c*, which can include a resistor and sense amplifier (not shown), Hall-effect sensor, or other current-measuring circuits known in the art. The measured data is sent to processing unit 190 via measurement data line 97*a*. Simultaneously with this subpixel current measurement, the light output of EL emitter 50 is measured by photodiode 55. Bias voltage 56 ($V_{DIODE}$) is provided to photodiode 55 in sensor 53 via diode supply line 57. The current through photodiode 55 is measured by current measuring unit 165*a*. The photodiode current can be passed to second voltage source 150 (as shown) or to another ground.

The measured current is sent to processing unit 190 via measurement data line 97*b*. Processing unit 190 stores measurements taken over time in memory 195 and tracks changes in the measurements over time. The process of driving and measuring described above may be repeated at more than one level by adjusting the controlled current source 120 (FIG. 5) to sequentially provide a plurality of levels of current and taking corresponding voltage and light-output measurements while controlled current source 120 provides each successive level of current. This permits characterization of EL emitter 50 degradation under various drive conditions and of the effect on the current through the reference subpixel caused by the change in electrical characteristics of the EL emitter 50.

Figure 7:
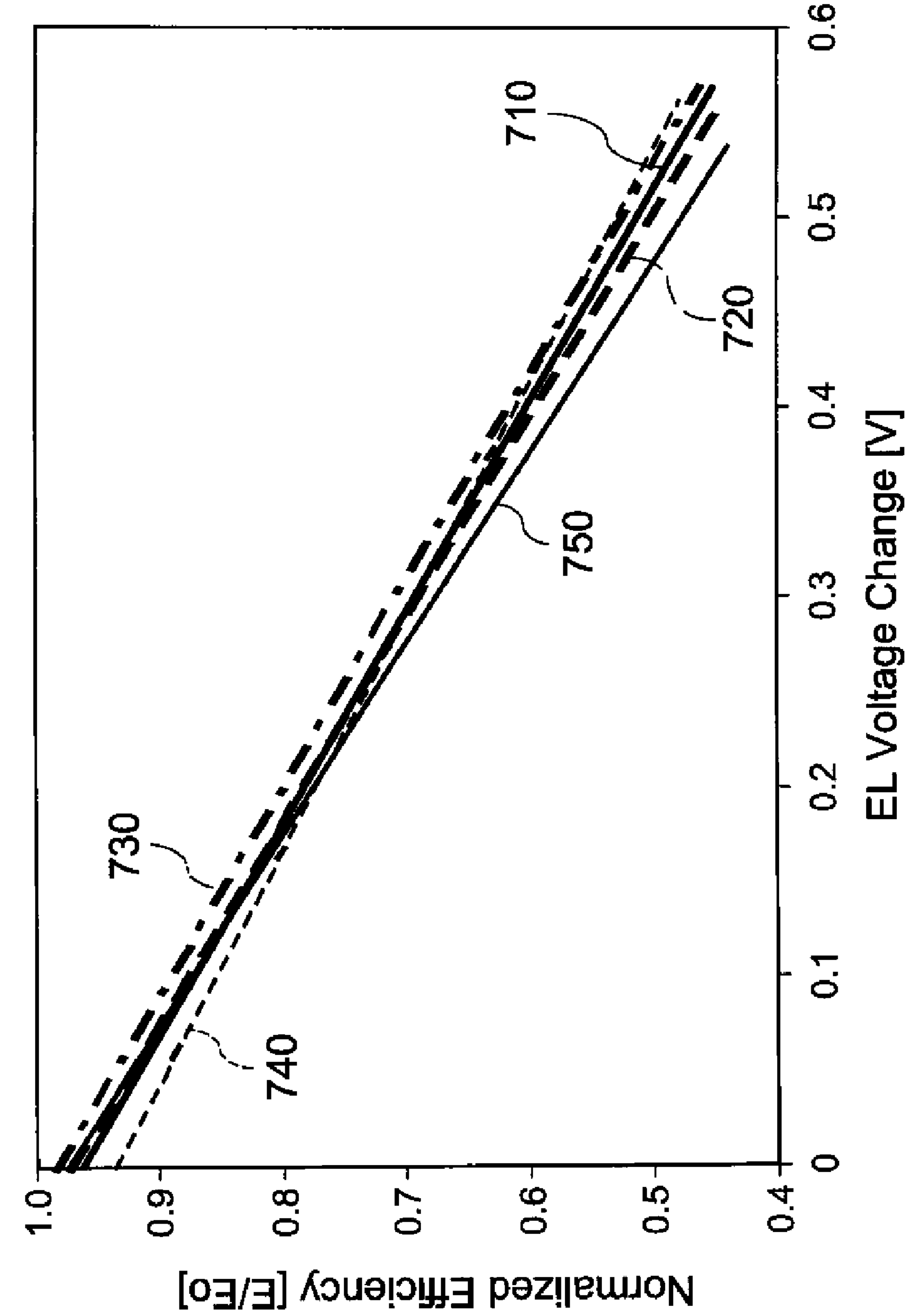
FIG. 7 is a graph showing a representative relationship between EL efficiency and the change in EL voltage.
Figure 8:
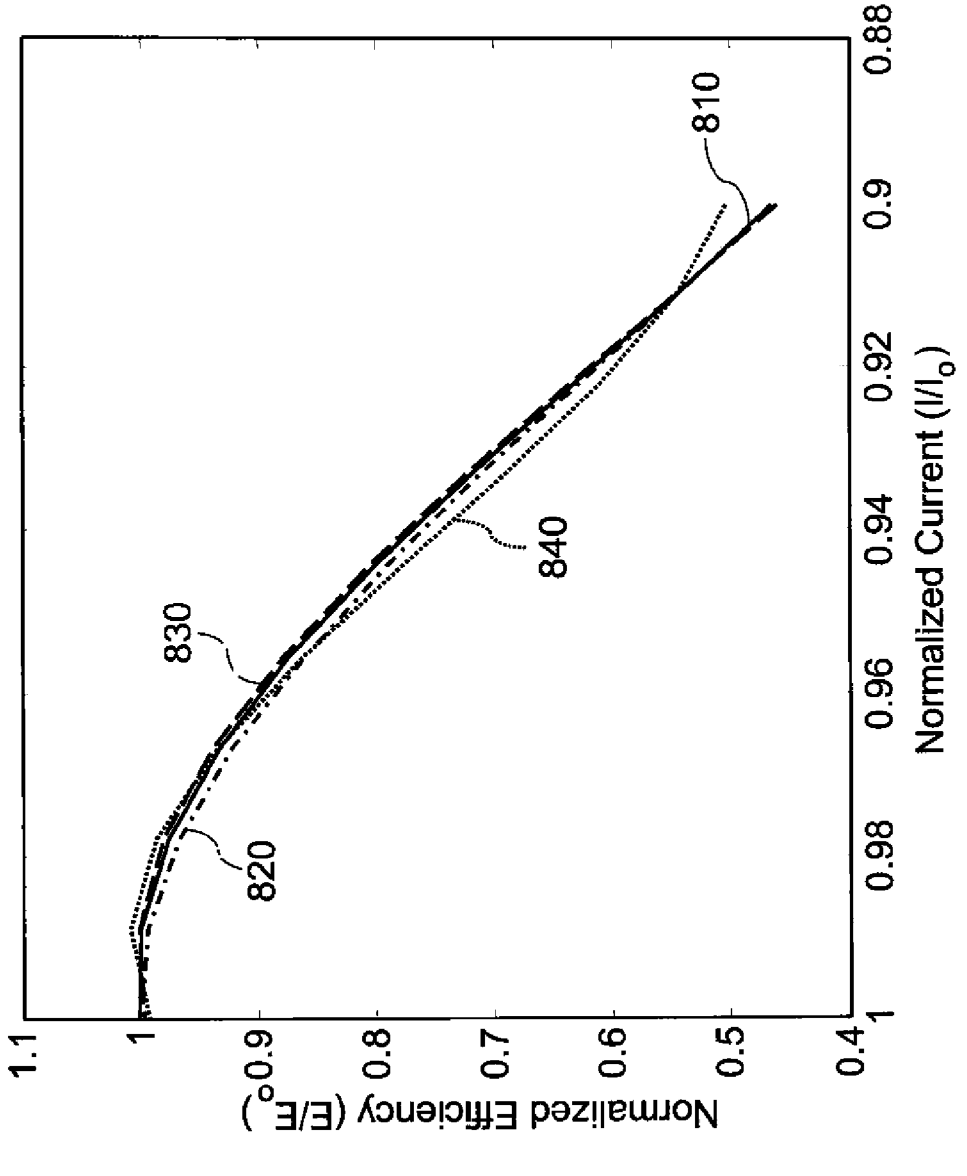
FIG. 8 is a graph showing a representative relationship between EL efficiency and the change in EL subpixel current.

Fade data and compensation methods according to various embodiments of the present invention are shown in FIGS. 7 and 8.

FIG. 7 shows an exemplary fade data plot of the relationship between the change in voltage of primary EL emitter 50 (FIG. 1A) and its change in normalized luminous efficiency over time when a constant current is driven through the device. A compensation algorithm corresponding to these data is implemented with the EL subpixel 60 and detector 250 of FIG. 3 and the reference area 100 of FIG. 5. Similar EL emitters were driven under different driving conditions to measure these data, and as the plot demonstrates, the relationship is similar regardless of how the EL emitter is driven. Curves 720, 730, 740, 750 show different devices and different current densities applied during aging. A compensation algorithm according to the present invention therefore uses the voltages measured for each primary EL emitter 50 both when new and after some aging has been incurred. The following equation is used to compute the normalized efficiency ($E/E_0$) at any given time:

$$\frac{E}{E_0} = f(\Delta V_{EL}) \quad \text{(Eq. 1)}$$

where $\Delta V_{EL}$ is the difference in voltage between its new value and its aged value. This relationship may be implemented as an equation or a lookup table. An example of function *f* is shown as curve 710, which is a least-squares linear fit of the data of curves 720, 730, 740, 750 measured from reference EL emitter 51 (FIG. 1A) over time. Other fitting and smoothing techniques known in the art, such as exponentially-weighted moving averaging (EWMA), can be used to produce function *f* from the detected aging-related electrical parameters from measurement unit 170 (FIG. 2) and the detected light output of the reference EL emitter 51 from the sensor 53.

FIG. 8 shows an exemplary fade data plot of the relationship between the change in current of a subpixel and its change in normalized luminous efficiency over time when a constant voltage is applied to the gate of the drive transistor. A compensation algorithm corresponding to these data is implemented with the EL subpixel 60 and detector 250 of FIG. 4 and the reference area 100 of FIG. 6. Curves 820, 830, 840 show different current densities applied during aging. A compensation algorithm according to the present invention therefore uses the change in current observed for a subpixel between when it was new and after some aging has been incurred. The following equation is used to compute the normalized efficiency ($E/E_0$) at any given time:

$$\frac{E}{E_0} = f\left(\frac{I}{I_0}\right) \quad \text{(Eq. 2)}$$

where $I/I_0$ is the normalized current relative to its new value (i.e. current at any given time, I, divided by the original current, $I_0$). This relationship may take the form of an equation or a lookup table. An example of function *f* is shown as curve 810, which is a least-squares linear fit of the data of curves 820, 830, 840 measured from reference EL emitter 51 over time.

Referring back to FIG. 2B, controller 190 uses normalized efficiency ($E/E_0$) to produce each corrected input signal by dividing the luminance or current commanded by the input signal by the normalized efficiency. For example, if $E/E_0=0.5$ for the primary EL emitter 50 corresponding to the input signal, indicating that primary EL emitter 50 only emits half as much light (50%) as it did when new for a given amount of current, the corrected input signal commands twice as much current as the input signal (1/0.5=2). Primary EL emitter 50 therefore maintains its light output over its life when driven by the corrected input signal.

Functions *f* of Eq. 1 and Eq. 2 encode the relationship between voltage (or current) change and normalized efficiency change. These functions are measured on one or more reference EL emitter(s) 51. If more than one reference EL emitter is measured, function *f* can be computed by averaging the results from all reference EL emitters 51, or by combining them in other ways known in the statistical art. For embodiments having multiple reference EL emitters 51 at different locations on EL device 10, illumination area 110 (FIG. 1A) is divided into a plurality of neighborhoods, one for each reference EL emitter. A separate function $f$ is computed for each reference EL emitter 51 and used to compute corrected input signals for primary EL emitter(s) 50 in the respective neighborhood. When computing corrected input signals, function $f$ is the same for all subpixels (or all subpixels in a neighborhood), but the respective $\Delta V_{EL}$ or $I/I_0$ for each subpixel is input to function $f$ to determine the respective normalized efficiency, and therefore to compute the corrected input signal.

Figure 9:
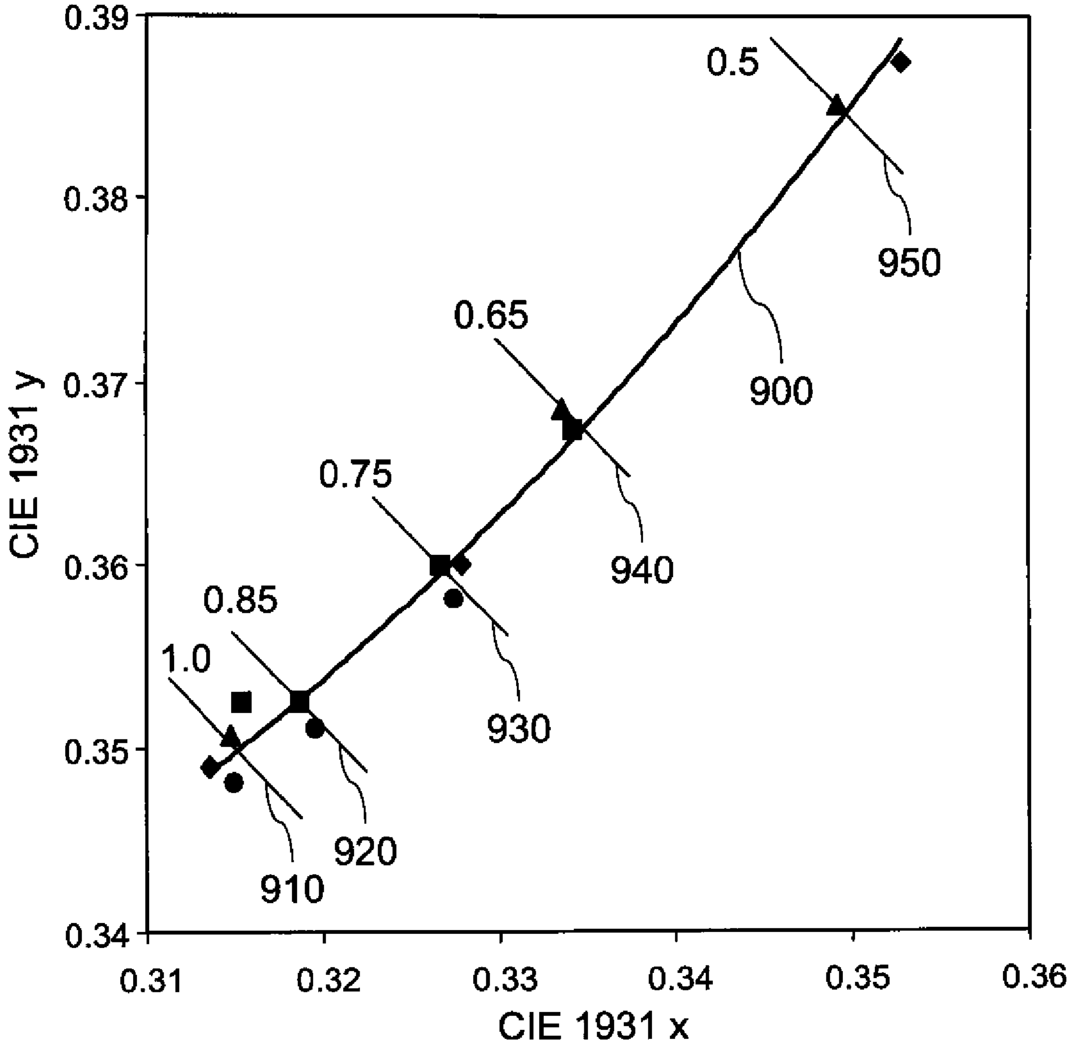
FIG. 9 is a graph showing a representative relationship between EL efficiency and the change in EL emitter chromaticity.

Referring to FIG. 9, there is shown a CIE 1931 x, y chromaticity diagram of a broadband ("W") EL emitter, which has a nominal white emission near (0.33, 0.33). Some EL emitters change chromaticity (color) as they age. This can cause objectionable visible artifacts. The square, diamond, triangle and circle markers are measured chromaticity data of various representative EL emitters aged at various current densities to various relative efficiencies. Curve 900 is a quadratic fit of all data with $R^2=0.9859$. Marker lines 910, 920, 930, 940 and 950 indicate the approximate normalized efficiency of the data points near those lines. Near marker line 910 are the data points before aging, so $E/E_0$ is approximately 1. Near marker line 920 $E/E_0$ is approximately 0.85, near marker line 930 $E/E_0$ is approximately 0.75, near marker line 940 $E/E_0$ is approximately 0.65, and near marker line 950 $E/E_0$ is approximately 0.5. To compensate for this shift, curve 900 can be expressed parametrically as a function of $E/E_0$. Controller 190 calculates or looks up in a table a CIE (x,y) pair corresponding to each normalized efficiency, and uses this (x,y) and a reference (x,y) to compute adjustments to the input signals to form the corrected input signals. For the example of FIG. 9, $$CIEx=0.0973(E/E_0)^2-0.2114(E/E_0)+0.429$$

$$CIEy=0.1427(E/E_0)^2-0.2793(E/E_0)+0.4868$$

define a quadratic parametric fit of curve 900 for the x and y components, respectively. Cubic fits or other fits known in the art can also be used for curve 900 or its parametric representation.

Figure 10:
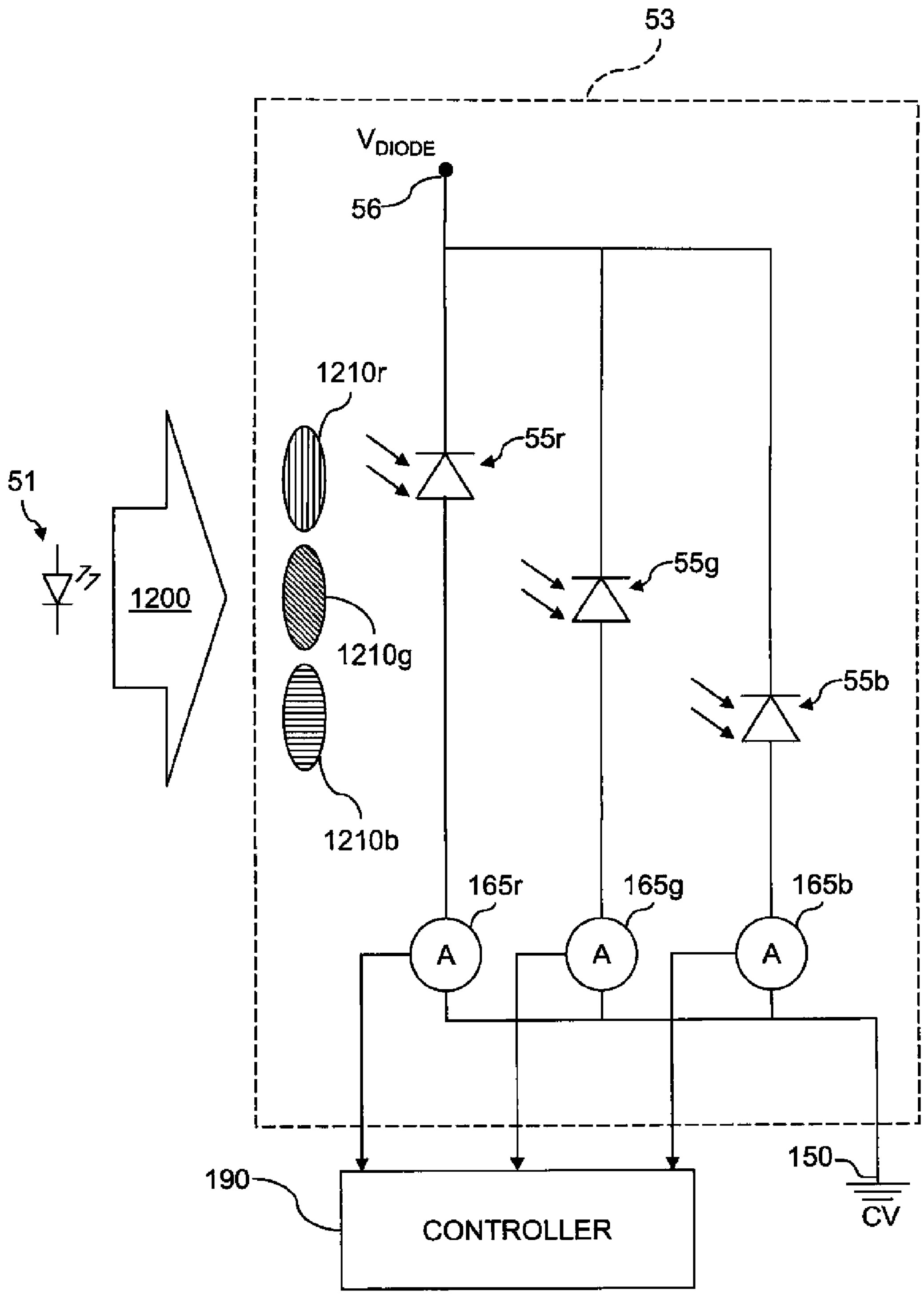
FIG. 10 is a schematic diagram of an embodiment of a reference area that can be used in the practice of the present invention.

Referring to FIG. 10, in an embodiment of the present invention, sensor 53 can be used to compensate for this chromaticity shift with age. Reference EL subpixel 51 produces light 1200 which has multiple frequencies of photons. Sensor 53 responds to light 1200 to provide color data to controller 190. Sensor 53 includes a colorimeter having a plurality of color filters and a plurality of corresponding photosensors, e.g. photodiodes. Color filters 1210*r*, 1210*g*, 1210*b* allow only red, green, and blue, respectively, light to pass. Photodiode 55*r* responds to the red light through color filter 1210*r*, photodiode 55*g* responds to the green light through color filter 1210*g*, and photodiode 55*b* responds to the blue light through color filter 1210*b*. Each produces a respective current, measured by current measurement units 165*r*, 165*g*, 165*b* respectively, and all three currents are reported to controller 190. Bias voltage 56 ($V_{DIODE}$) is provided to all three photodiodes 55*r*, 55*g*, 55*b*, and the photodiode current can be passed to second voltage source 150 (as shown) or to another ground, as described above. Different bias voltages can be used for each photodiode. The number of photodiodes can be two or more, and the colors passed by the filters can be R, G, B; C, M, Y; or any other combination in which no two filter passbands substantially overlap.

Sensor 53 can also include a tristimulus colorimeter, in which color filters 1210*r*, 1210*g*, 1210*b* allow only light matching the CIE 1931 $\bar{x}(\lambda)$, $\bar{y}(\lambda)$, and $\bar{z}(\lambda)$ color matching functions (CIE 15:2004, section 7.1), respectively, to pass. Alternatively, sensor 53 can be a spectrophotometer or spectroradiometer, as known in the art, using a grating and a linear sensor or one or more photosensor(s) to measure the intensity of light across a range of wavelengths (e.g. 360 nm to 830 nm), or other known color sensors or colorimeters. In a spectrophotometer or spectroradiometer, controller 190, or a separate controller in sensor 53, calculates tristimulus values by multiplying each point of the measured data with the appropriate color matching function calculated at the corresponding wavelength and integrating the products over the wavelengths (CIE 15:2004 Eq. 7.1).

Each color filter can be a colored photoresist (e.g. Fuji-Hunt Color Mosaic CBV blue color resist), or a photoresist (e.g. Rohm & Haas MEGAPOSIT SPR 955-CM general purpose photoresist) with a pigment (e.g. Clariant PY74 or BASF Palitol(R) Yellow L 0962 HD PY138 for yellow-transmitting pigments useful in green color filters, or a Toppan pigment). Each color filter has a transmission spectrum which can be represented using CIE 1931 x, y chromaticity coordinates.

Controller 190 receives color data from sensor 53 for each photodiode 55*r*, 55*g*, 55*b*, and converts that data into chromaticity coordinates of reference EL emitter 51. For example, using red, green and blue color filters having chromaticities matching those of the sRGB standard (IEC 61966-2-1:1999+A1), namely (0.64, 0.33), (0.3, 0.6), (0.15, 0.06) respectively, linear (with respect to luminance) photodiode data R, G, B can be converted to CIE tristimulus values X, Y, Z, according to Eq. 3 (sRGB section 5.2, Eq. 7):

$$\begin{bmatrix} X \\ Y \\ Z \end{bmatrix} = \begin{bmatrix} 0.4124 & 0.3576 & 0.1805 \\ 0.2126 & 0.7152 & 0.0722 \\ 0.0193 & 0.1192 & 0.9505 \end{bmatrix} \begin{bmatrix} R \\ G \\ B \end{bmatrix} \quad \text{(Eq. 3)}$$

Chromaticity coordinates x, y are then calculated according to CIE 15:2004 (3rd ed.) Eq. 7.3, given as Eq. 4:

$$x = \frac{X}{X+Y+Z} \qquad y = \frac{Y}{X+Y+Z} \quad \text{(Eq. 4)}$$

These chromaticity coordinates can be correlated to normalized efficiency, as on FIG. 9, or directly to $\Delta V_{EL}$ or $I/I_0$ using the appropriate function $f$. Controller 190 can then adjust each input signal to compensate. For example, in an EL device using a W emitter and color filters to form red, green and blue subpixels, if they coordinate increases over time, the luminance of green subpixels will rise and that of red and blue subpixels will fall. Controller 190 can then decrease the commanded luminances of green subpixels by lowering their corresponding corrected input signals, and increase the commanded luminances of red and blue subpixels by raising their corresponding corrected input signals, to compensate for this change in y coordinate.

By using fade data measured in the reference area and aging-related electrical parameter measurements from each primary EL emitter 50 when applying corrected input signal 252 (FIG. 2B) to primary EL emitter 50, compensation is made for the shift in chromaticity of each primary EL emitter 50 due to aging. EL subpixels 60 on EL device 10 are grouped into pixels 65 (FIG. 1A) having e.g. red, green and blue subpixels or red, green, blue and broadband ("W", e.g. a white or yellow color) subpixels. Pixels 65 of the latter arrangement are referred to as "RGBW" pixels.

Figure 11:
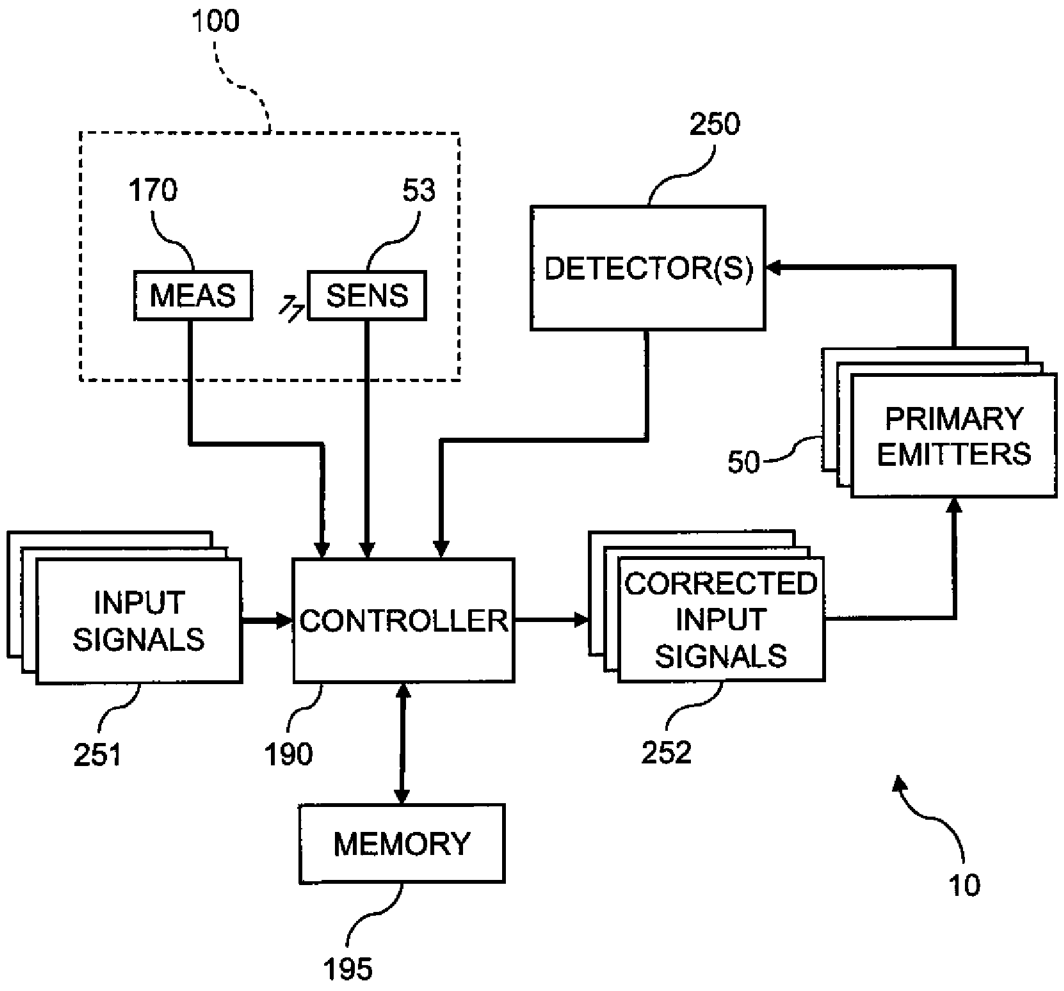
FIG. 11 is a data-flow diagram according to an embodiment of the present invention.

FIG. 11 shows a flow diagram of data through components of EL device 10 according to an embodiment of the present invention. On FIG. 11, bold arrows and stacked rectangles indicate multiple values. In this embodiment, the controller is adapted to form corrected input signals 252 which compensate for chromaticity shift of the respective primary EL emitters 50 due to aging.

A plurality of input signals 251, one for each primary EL emitter 50, is provided by image-processing electronics or other structures known in the art. As shown on FIG. 1A, each primary EL emitter 50 is in a respective EL subpixel 60 in a corresponding pixel 65. Controller 190 forms respective corrected input signals 252 from a plurality of the input signals 251 to compensate for chromaticity shift of primary EL emitter 50 due to aging, as described above. For example, all four input signals (R, G, B, W) can be used in producing each corrected input signal 252, to permit the adjustments described above. Alternatively, for the R, G and B EL subpixels 60, the respective input signal 251 can be used along with the W input signal 251 to produce the corrected input signal 252.

The corrected input signals 252 are supplied to respective primary EL emitters 50 in EL subpixels 60 (FIG. 1A) to cause the EL emitters 50 to emit light corresponding to the respective corrected input signals. EL device 10 can also include memory 195 as described above.

Controller 190 uses the aging-related electrical parameter of reference EL emitter 51 (FIG. 1) detected by measurement unit 170 in reference area 100, and the light from reference EL emitter 51 detected by sensor 53, as described above. The controller also uses, for each primary EL emitter 50, a respective measurement of an aging-related electrical parameter from that primary EL emitter 50, measured by one or more detector(s) 250, as described above. Chromaticity fade data from one reference EL emitter 51 is thus used in compensating for aging of multiple primary EL emitters 50.

In a preferred embodiment, the invention is employed in a device that includes Organic Light Emitting Diodes (OLEDs) which are composed of small molecule or polymeric OLEDs as disclosed in but not limited to U.S. Pat. No. 4,769,292, by Tang et al., and U.S. Pat. No. 5,061,569, by VanSlyke et al. Many combinations and variations of organic light emitting materials can be used to fabricate such a device. Referring to FIG. 1A, when primary EL emitter 50 is an OLED emitter, EL subpixel 60 is an OLED subpixel, and EL device 10 is an OLED device. In this embodiment, reference EL emitter 51 is also an OLED emitter.

Transistors 70, 80 and 90 can be amorphous silicon (a-Si) transistors, low-temperature polysilicon (LTPS) transistors, zinc oxide transistors, or other transistor types known in the art. They can be N-channel, P-channel, or any combination. The OLED can be a non-inverted structure (as shown) or an inverted structure in which EL emitter 50 is connected between first voltage source 140 and drive transistor 70.

The invention has been described in detail with particular reference to certain preferred embodiments thereof, but it will be understood that variations and modifications can be effected within the spirit and scope of the invention.

PARTS LIST

| | |
|---|---|
| 10 | EL device |
| 13 | gate driver |
| 15 | reference driver circuit |
| 15a | reference driver circuit |

-continued

PARTS LIST

| | |
|---|---|
| 15b | reference driver circuit |
| 15c | reference driver circuit |
| 20 | select line |
| 30 | readout line |
| 35 | data line |
| 35a | data line |
| 50 | primary EL emitter |
| 51 | reference EL emitter |
| 51a | reference EL emitter |
| 51b | reference EL emitter |
| 51c | reference EL emitter |
| 53 | sensor |
| 53a | sensor |
| 53b | sensor |
| 53c | sensor |
| 55 | photodiode sensor |
| 55r | photodiode sensor |
| 55g | photodiode sensor |
| 55b | photodiode sensor |
| 56 | bias voltage |
| 57 | diode supply line |
| 58 | temperature measurement unit |
| 60 | EL subpixel |
| 61 | EL subpixel |
| 65 | pixel |
| 70 | drive transistor |
| 75 | capacitor |
| 80 | readout transistor |
| 90 | select transistor |
| 94 | status line |
| 95 | control line |
| 96 | readout line |
| 97a | measurement data line |
| 97b | measurement data line |
| 100 | reference area |
| 100a | reference area |
| 100c | reference area |
| 110 | illumination area |
| 120 | controlled current source |
| 140 | first voltage source |
| 150 | second voltage source |
| 155 | source driver |
| 160 | voltage measuring unit |
| 165a | current measuring unit |
| 165b | current measuring unit |
| 165c | current measuring unit |
| 165r | current measuring unit |
| 165g, | current measuring unit |
| 170 | measurement unit |
| 170a | measurement unit |
| 170b | measurement unit |
| 170c | measurement unit |
| 190 | controller |
| 192 | timer |
| 195 | memory |
| 250 | detector |
| 251 | input signal |
| 252 | corrected input signal |
| 710 | curve |
| 720 | curve |
| 730 | curve |
| 740 | curve |
| 750 | curve |
| 810 | curve |
| 820 | curve |
| 830 | curve |
| 840 | curve |
| 900 | curve |
| 910 | marker line |
| 920 | marker line |
| 930 | marker line |
| 940 | marker line |
| 950 | marker line |
| 1000a | operational curve |
| 1000b | operational curve |
| 1000c | operational curve |
| 1010 | fade curve |
| 1200 | light |

-continued

| PARTS LIST | |
|---|---|
| 1210b | color filter |
| 1210g | color filter |
| 1210r | color filter |

The invention claimed is:

1. An electroluminescent (EL) device, comprising:

an illumination area comprising one or more primary EL emitters;

a reference area comprising a reference EL emitter;

a reference driver circuit configured to cause the reference EL emitter to emit light while the EL device is active;

a sensor configured to detect light emitted by the reference EL emitter;

a measurement unit configured to detect an aging-related electrical parameter of the reference EL emitter while the reference EL emitter is emitting light; and a controller configured to:

receive an input signal for each primary EL emitter in the illumination area, form a corrected input signal from each input signal using the detected light and the aging-related electrical parameter, and apply the corrected input signals to the respective primary EL emitters in the illumination area, wherein the reference driver circuit is further configured to cause the reference EL emitter to emit light at two levels, a measurement level and a fade level, at different times, and wherein the measurement unit is further configured to take measurements of the reference EL emitter while the reference EL emitter emits light at the measurement level.

2. The EL device of claim 1, wherein the controller is further configured to form corrected input signals which compensate for loss of efficiency of the respective primary EL emitters.

3. The EL device of claim 1, wherein the sensor comprises:

a colorimeter, a spectrophotometer, or a spectroradiometer, for providing color data to the controller, wherein the controller is further configured to form corrected input signals which compensate for chromaticity shift of the respective primary EL emitters due to aging.

4. The EL device of claim 1, wherein the reference area further comprises:

a plurality of reference EL emitters;

a plurality of corresponding reference driver circuits configured to cause the respective reference EL emitters to emit light;

a plurality of corresponding sensors configured to detect light emitted by the respective reference EL emitters; and a plurality of corresponding measurement units configured to detect respective aging-related electrical parameters of the respective reference EL emitters while the respective reference EL emitters are emitting light, wherein the controller is further configured to use one or more of the plurality of detected light and aging-related electrical parameters to form a corrected input signal from each input signal.

5. The EL device of claim 1, further comprising:

a temperature measurement unit configured to measure a temperature parameter related to the temperature of the reference EL emitter while the reference EL emitter is emitting light, wherein the controller is further configured to use the measured temperature parameter to form the corrected input signals.

6. The EL device of claim 1, wherein the fade level is greater than the measurement level.

7. The EL device of claim 1, wherein:

each input signal controls a respective emission level of the corresponding primary EL emitter; and the fade level is greater than the maximum of the respective emission levels.

8. The EL device of claim 1, further comprising:

a memory configured to store detected light measurements and corresponding aging-related electrical parameter measurements, wherein the controller is further configured to use the values stored in the memory to form the corrected input signals.

9. The EL device of claim 1, wherein:

the reference driver circuit is further configured to case the reference EL emitter to emit light successively at a plurality of measurement levels; and respective measurements of the reference EL emitter are taken while it emits light at each measurement level.

10. The EL device of claim 1, wherein the reference EL emitter and all primary EL emitters comprise a same size and composition.

11. The EL device of claim 1, wherein the reference driver circuit is further configured to provide a test current to the reference EL emitter to cause the reference EL emitter to emit light.

12. The EL device of claim 1, further comprising:

a timer configured to run while the EL device is active, wherein the measurement unit is further configured to take measurements of the reference EL emitter at intervals determined by the timer.

13. The EL device of claim 1, wherein a measurement of the reference EL emitter is taken while the EL device is in thermal equilibrium.

14. The EL device of claim 1, wherein the measurement unit is further configured to take a measurement of the reference EL emitter while the EL device is active.

15. The EL device of claim 1, further including a second reference area comprising a second reference EL emitter.

16. The EL device of claim 1, wherein the EL device comprises an EL display.

17. The EL device of claim 1, wherein the aging-related electrical parameter comprises a voltage or a current.

18. The EL device of claim 1, wherein each primary EL emitter and reference EL emitter comprises an organic light-emitting diode emitter.

* * * * *